(12) United States Patent
Goldenberg et al.

(10) Patent No.: US 10,032,389 B2
(45) Date of Patent: Jul. 24, 2018

(54) VIDEO MAGNIFIER CAMERA WITH HANDLE

(71) Applicant: Freedom Scientific, Inc., St. Petersburg, FL (US)

(72) Inventors: Michael Goldenberg, Melbourne, FL (US); Thomas William Murray, Philadelphia, PA (US); Robert Leon, Miami, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 599 days.

(21) Appl. No.: 14/607,197

(22) Filed: Jan. 28, 2015

(65) Prior Publication Data

US 2015/0215499 A1    Jul. 30, 2015

Related U.S. Application Data

(60) Provisional application No. 61/933,128, filed on Jan. 29, 2014.

(51) Int. Cl.
*G09B 21/00*    (2006.01)

(52) U.S. Cl.
CPC .................. *G09B 21/008* (2013.01)

(58) Field of Classification Search
CPC ............................ G09B 21/008; H04N 5/2354
See application file for complete search history.

(56) References Cited

U.S. PATENT DOCUMENTS 6,064,426 A * 5/2000 Waterman .............. H04N 7/183
348/63

| | | |
|---|---|---|
| D451,939 S | 12/2001 | Roh |
| 2004/0189847 A1 | 9/2004 | Hogrebe et al. |
| 2004/0211868 A1 | 10/2004 | Holmes et al. |
| 2006/0290812 A1* | 12/2006 | Hsu ........................... G06F 1/16 348/552 |
| 2011/0074940 A1* | 3/2011 | Goldenberg ......... G02B 27/026 348/63 |
| 2012/0243200 A1* | 9/2012 | Sutton .................... G03B 15/02 362/11 |

FOREIGN PATENT DOCUMENTS

| WO | 1988006128 A1 | 8/1988 |
|---|---|---|
| WO | WO 88/06128    * | 8/1988 |

OTHER PUBLICATIONS

Anonymous: "Portable webcam for laptops", Dec. 21, 2010 (Dec. 21, 2010), XP055375756, Retrieved from the Internet: URL:http://download.p4c.philips.com/files/s/spc610nc_00/spc610nc_00_dfu_eng.pdf [retrieved on May 24, 2017].

* cited by examiner

*Primary Examiner* — William C Vaughn, Jr.
*Assistant Examiner* — Jerry Jean Baptiste
(74) *Attorney, Agent, or Firm* — GrayRobinson, P.A.; Michael J. Colitz, III

(57) ABSTRACT

Disclosed is a video magnifier. In particular, the disclosure relates to a desktop video magnifier that is design to be portable. The magnifier includes a high definition camera that is mounted upon a flexible arm. The camera arm swivels and pivots to allow the user to properly position the camera over the object to be viewed. The device is supported by a stand and a base. The stand includes a handle with a trough. The flexible arm is dimensioned to be received within the trough with the device in the collapsed configuration.

10 Claims, 5 Drawing Sheets

VIDEO MAGNIFIER CAMERA WITH HANDLE

CROSS REFERENCE TO RELATED APPLICATIONS

This application claims priority to U.S. Application Ser. No. 61/933,128, filed Jan. 29, 2014, and entitled "Video Magnifier Camera With Handle," the contents of which are fully incorporated herein for all purposes.

TECHNICAL FIELD

This disclosure relates to a video magnifier. More particularly, the present disclosure relates to a video magnifier with a handle for ease of transport.

BACKGROUND OF THE INVENTION

Video magnifiers are import tools for blind and/or low vision ("BLV") users. These devices allow BLV users to view objects and/or text by positioning an associated camera and selecting a desired level of magnification. Color contrasting and image rotation can also be provided to ease viewing. Video magnifiers typically include a camera and an associated monitor. The camera is often mounted on an arm that can be positioned over the object to be viewed. An X-Y table can be positioned beneath the camera for supporting the object being viewed. The user can move the table in the X-Y orientations to probably align the camera with the object. A separate controller is used to change: magnification level; the position of the image upon the screen; contrast; as well as other image features.

Video magnifiers have typically been designed to permanently reside on a table or desktop. The portability of video magnifiers has often proved problematic. Most video magnifiers must be at least partially or totally disassembled for storage and transport. Even for sighted users, this is far from an ideal solution. It is an especially problematic solution for BLV users, who often times cannot carry out the disassembly/assembly process. Efforts have been made over the years to provide truly portable video magnifiers. However, these portable magnifiers typically use smaller, low resolution cameras. Other portable magnifier cameras are designed to be handheld, which can be problematic in the event the user needs both hands free while viewing the object.

What is needed, therefore, is a desktop video magnifier camera that is transportable and that employs a high resolution camera. The video magnifier of the present disclosure is designed to fulfill these and other shortcomings present with existing video magnifiers.

SUMMARY OF THE INVENTION

This disclosure provides a desktop video magnifier that is portable.

The disclosed system has several important advantages. For example, the video magnifier uses a high definition camera without sacrificing portability.

Another advantage is realized by providing a video magnifier that although designed for desktop use is readily transportable by blind and/or low vision users.

A further possible advantage is achieved by employing a camera arm that is flexible and pivotal and that has collapsed and extended orientations.

Still yet another possible advantage is achieved by providing a carrying handle for a desktop video magnifier.

Another advantage is attained by providing a pivotal camera arm that forms part of the carrying handle while in the collapsed orientation.

Yet another advantage is provided by allowing the video magnifier camera to be easily converted for use by either a right or a left handed user.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

PARTS LIST

| | |
|---|---|
| 10 Camera Assembly | 38 Remote Control |
| 20 Stand | 42 Monitor |
| 22 Base | 44 Hinge for Monitor |
| 24 Right Portion of Stand | 46 Spring |
| 26 Left Portion of Stand | 52 Camera |
| 28 Handle | 54 Camera Arm |
| 32 Handle Trough | 56 Camera Arm Hinge Assembly |
| 34 Power Switch | 58 Hinge for Camera |
| 36 Plug | 62 LED lights |

DETAILED DESCRIPTION OF THE DRAWINGS

The present disclosure relates to a video magnifier. In particular, the disclosure relates to a desktop video magnifier that is designed to be portable. The magnifier includes a high definition camera that is mounted upon a flexible arm. The camera arm swivels and pivots to allow the user to properly position the camera over the object to be viewed. The device is supported by a stand and a base. The stand includes a handle with a trough. The flexible arm is dimensioned to be received within the trough with the device in the collapsed configuration. The various components of the present invention, and the manner in which they interrelate, are described in greater detail hereinafter.

Figure 1:
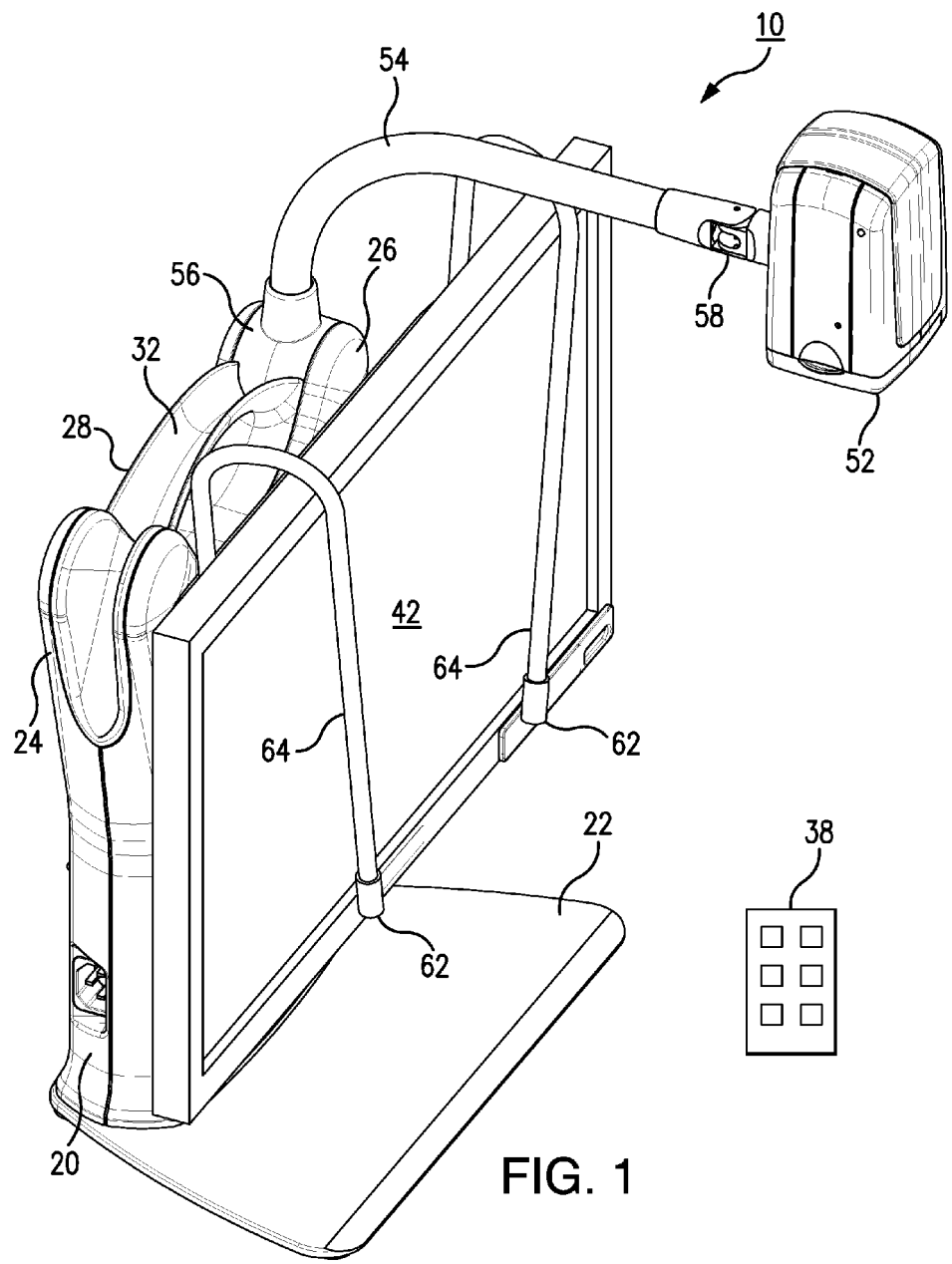
FIG. 1 is a perspective view of the magnifier of the present disclosure.
Figure 2:
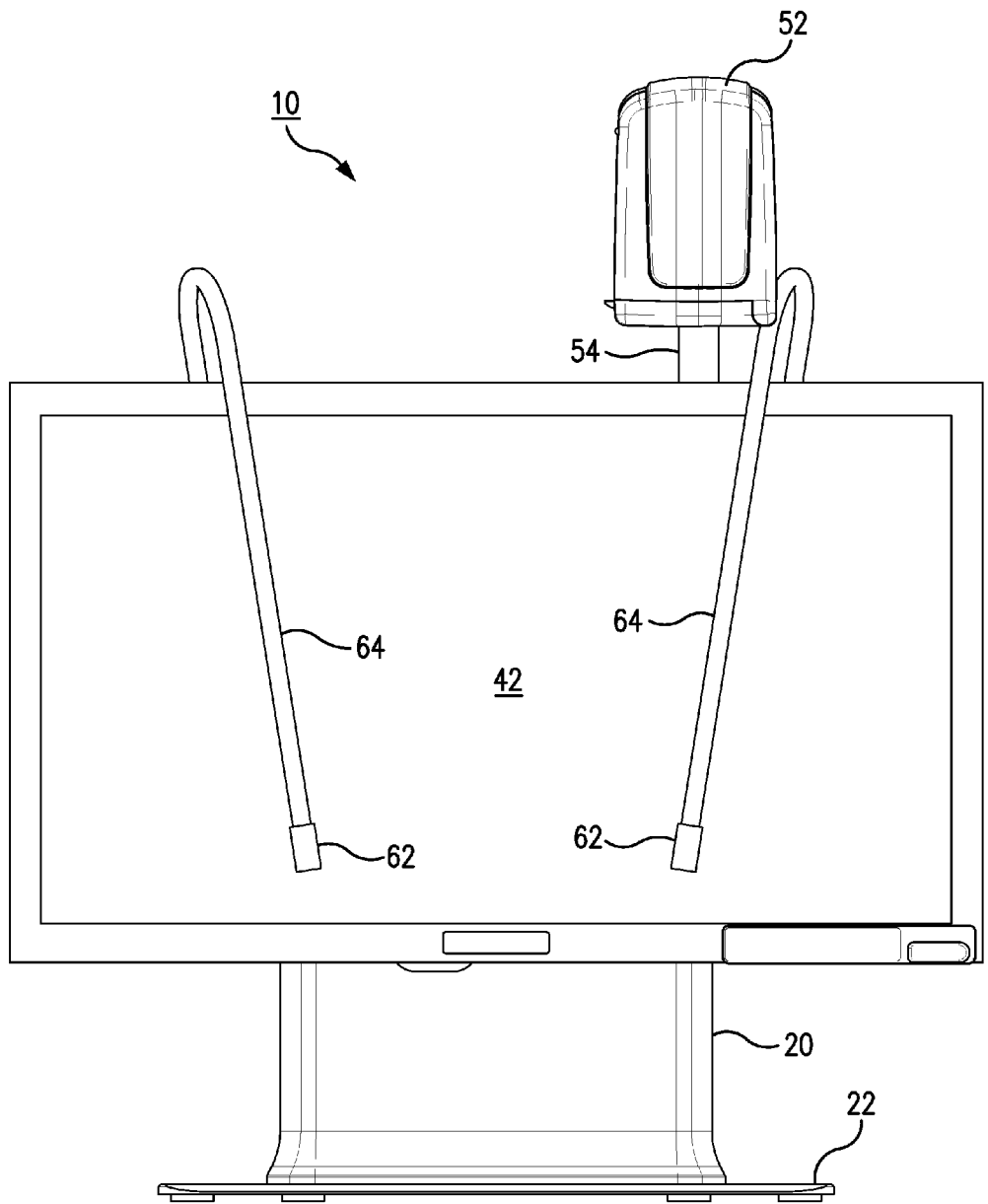
FIG. 2 is a front elevational view of the magnifier camera of the present disclosure.

With reference now to FIG. 1, the video magnifier assembly 10 of the present disclosure is depicted. Magnifier assembly 10 is supported by a stand 20 and a lower base 22. Base 22 is designed to be placed upon a table or desk. As a result, magnifier assembly 10 is not hand held. This allows the blind or low vision user use his or her hands while using the device. As most clearly shown in FIGS. 4 and 5, stand 20 includes both a right hand portion 24 and a left hand portion 26. A handle 28 bridges the right and left hand portions (24 and 26). Handle 28 includes a trough 32 formed along its length. As such, handle 28 has a U-shaped cross section. In the specific embodiment illustrated in FIGS. 4 and 5, trough 32 extends into the right hand portion 24. However, depending upon whether assembly 10 is configured for a right or left handed user, trough 32 may extend into the left hand portion 26.

A power switch 34 and electrical plug 36 are formed within stand 20. Stand 20 may also house electrical connectors and the associated components for the camera, lights, and monitor. A remote control 38 is provided for controlling the various functions of the camera and monitor. For example, remote control 38 can control the magnification level of the camera, the camera contrast, the displayed color scheme, as well as the orientation of the object upon the monitor. Remote control 38 can also control the lighting. In one embodiment, the lighting can be automatically adjusted depending upon the level of magnification chosen by the user.

Figure 3:
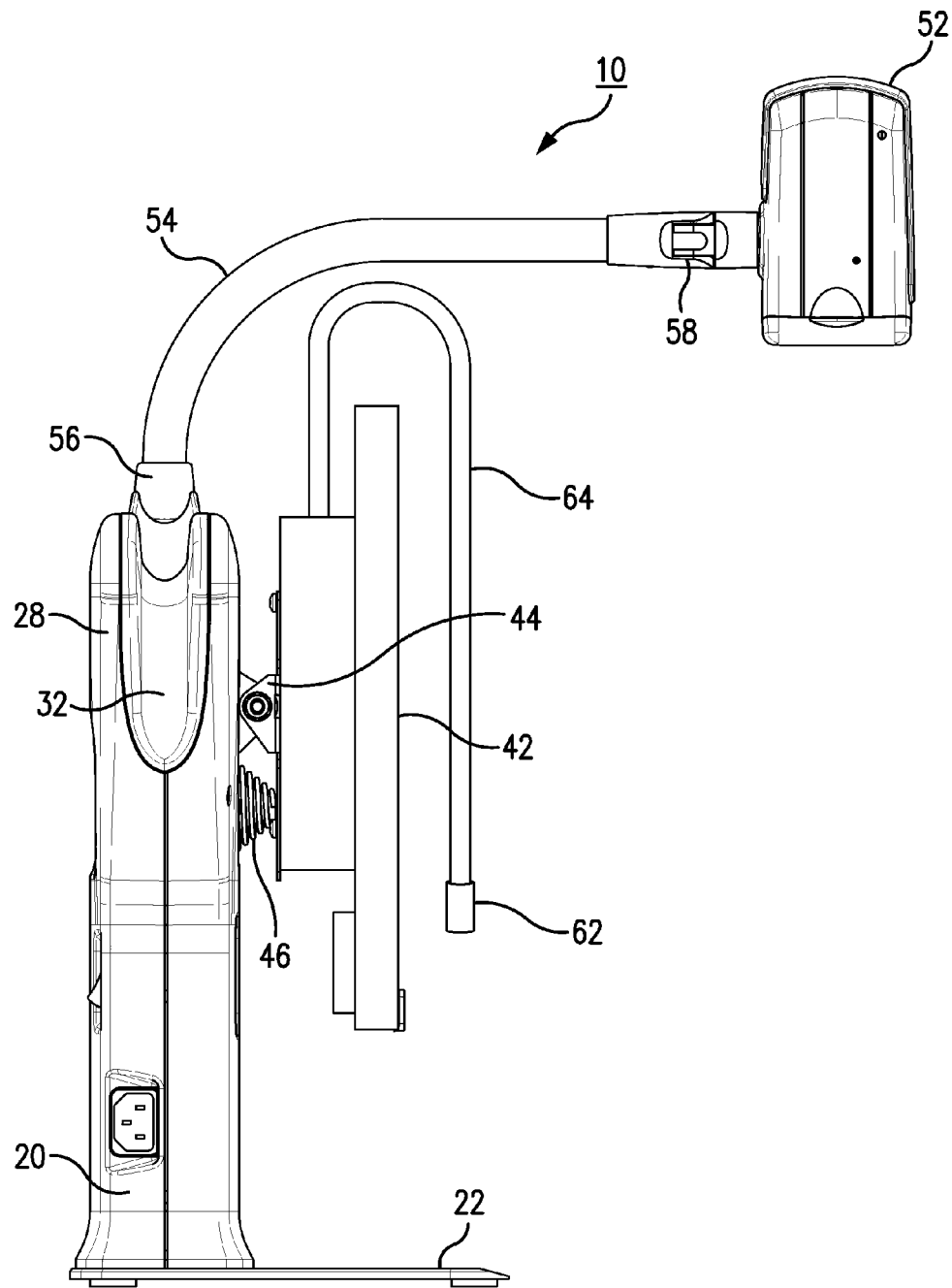
FIG. 3 is a side elevational view of the magnifier camera of the present disclosure.

Images of the magnified objects are displayed on monitor 42. Monitor 42 can be a conventional LCD monitor. It is designed to be removably secured to base 20 via a series of detents (not shown). Thus, monitor 42 can be removed by a user for servicing or replacement. With reference to FIG. 3, it can be seen that monitor 42 is preferably secured to stand 20 via a pivotal link 44. A compression washer can be included within link 44 such that monitor 42 maintains its angular position unless it is otherwise manipulated by a user. A compression spring 46 is optionally included between monitor 42 and stand 20 to urge monitor 42 to a generally upright or vertical orientation.

A camera 52 is included for viewing objects. In the preferred embodiment, camera 52 is a high resolution (1080 horizontal lines of vertical resolution) active lines digital video camera. It provides an enlarged video image to monitor 42. Camera 52 can be positioned in a wide variety of orientations via a flexible camera arm 54. Arm 54 is preferably flexible along its entire length.

Figure 4:
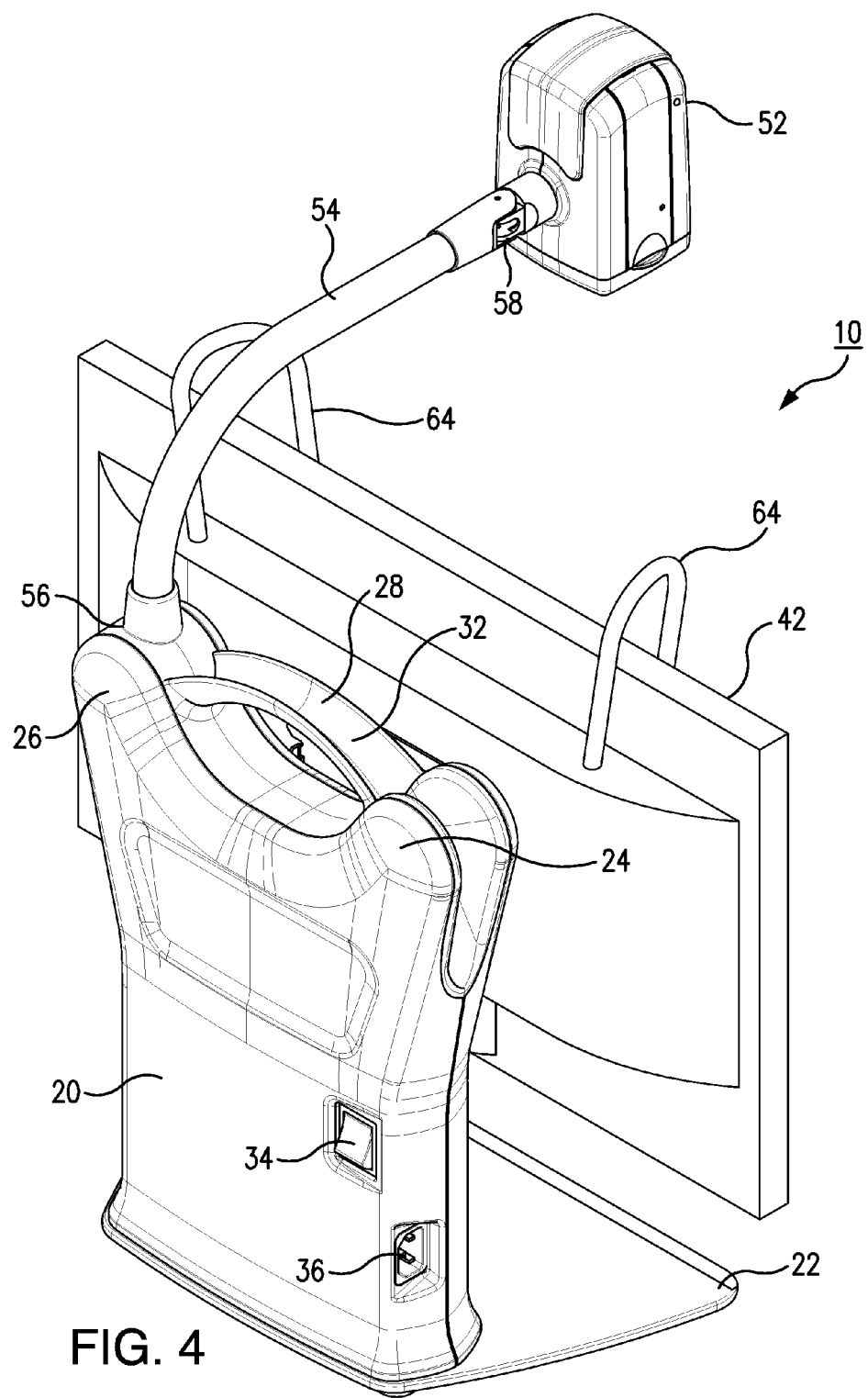
FIG. 4 is an additional perspective view of the magnifier camera of the present disclosure in the extended orientation.
Figure 5:
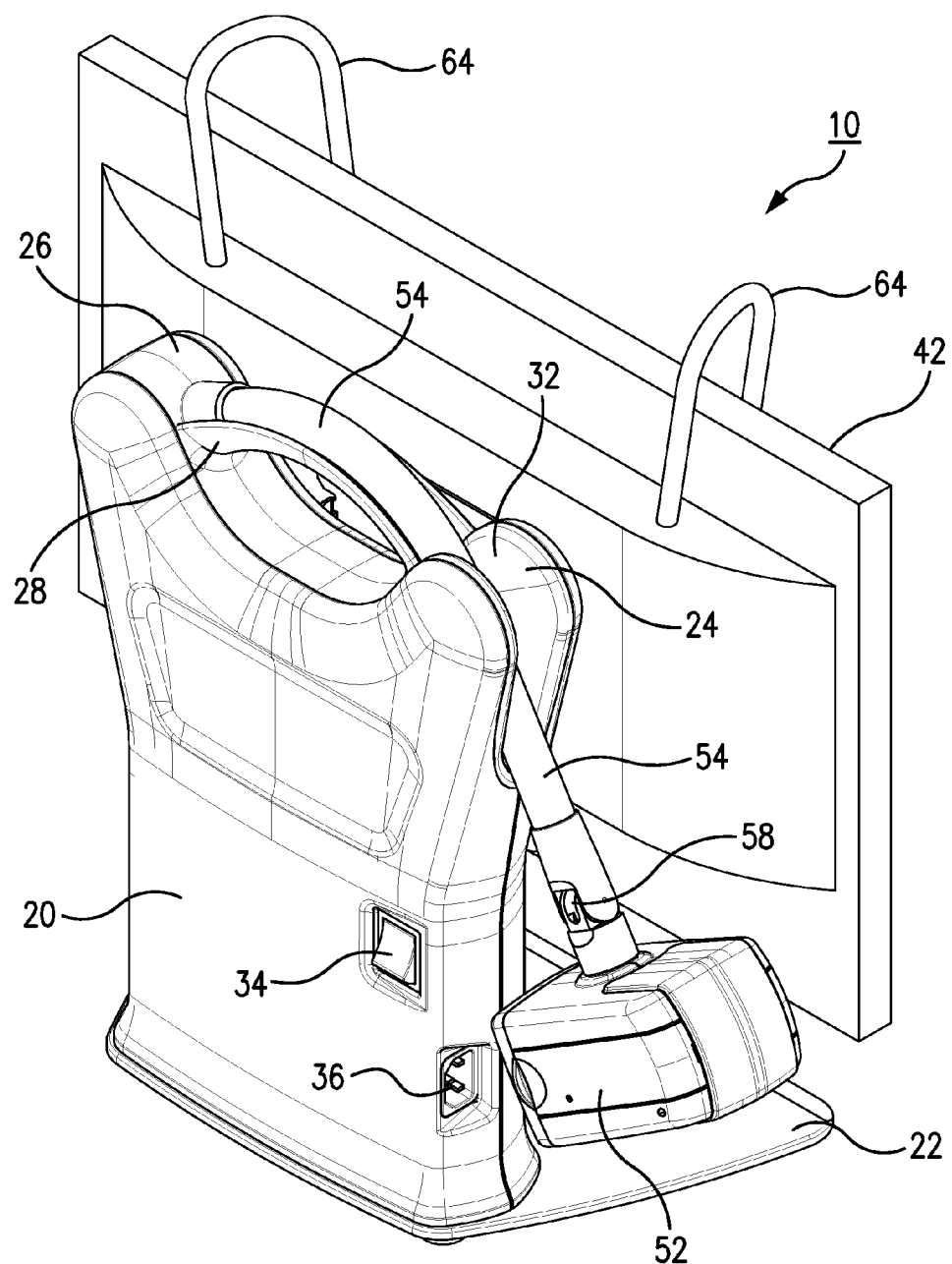
FIG. 5 is an additional perspective view of the magnifier camera of the present disclosure in the collapsed orientation.

A hinge assembly 56 is included at the base of arm 52. Notably, hinge assembly 56 can be selectively housed in either the right hand portion 24 or the left hand portion 26 of stand 20, depending upon whether the user is right or left handed. FIG. 4 illustrates hinge assembly 56 mounted within the left hand portion 26 of stand 20. This is the preferred position for use by a right hand user. Namely, a user in front of monitor 42 would use their right hand to pivot camera arm 54 upwardly to the extended orientation. Conversely, the hinge assembly 56 would be positioned within the right hand portion 24 of stand 20 for a left handed user. The modification between right handed or left handed configurations can be made either by the manufacturer or the end user.

To allow for the full adjustability of camera 52, the hinge assembly 56 includes both a swivel and a pivot. The swivel allows arm 54 to rotate about a generally vertical axis. By swiveling arm 54, the camera 52 can be positioned over objects either in front of, or to the side of, monitor 42. The pivot allows arm to be selectively moved between the collapsed (FIG. 5) and extended (FIG. 4) orientations. An additional hinge 58 is included between camera 52 and arm 54 to allow camera 52 to be moved from side to side with respect to arm 54. As noted in FIG. 5, when in the collapsed orientation, arm 54 is positioned within trough 32. In the preferred embodiment, trough 32 extends along handle 28 and into the right hand portion 24. When fully collapsed, camera 52 is positioned behind monitor 42 and to the side of stand 20. In this configuration, the user can transport the entire assembly 10 by grasping both handle 28 and the flexible arm 54.

Lighting for the viewed object is provided by two lights 62. In the preferred embodiment, these are light emitting diodes (LED), although the use of other lighting is within the scope of the present disclosure. Flexible arms 64 are mounted behind monitor 42 and are used in selectively orientating lights 62 as needed. Power for the lights 62 can be provided via an external outlet via plug 36.

In use, a user can place the assembly 10 upon a desk or table. Plug 36 is used to couple the assembly 10 to a conventional outlet. A standard 120 volt power outlet is sufficient for powering lights 62, camera 52, and monitor 42. The unit can then be turned on via switch 34. The user then pivots camera arm 54 upwardly from trough 32. Camera can be positioned via swivel within hinge assembly 56. This allows camera 52 to be positioned over the desired object, whether the object is placed in front of, beside, or even in back of monitor 42. Additional adjustment can be made via camera hinge 58. The user can then use remote control 38 to provide the desired magnification level, color contrast, or image orientation. The user is then free to view the enlarged object on monitor 42. The user can manually manipulate arms 64 to provide the necessary lighting for the object. Once complete, the assembly 10 can be powered down and camera arm 54 can be positioned back into trough 32. Once the power cord is removed, the entire assembly 10 can be carried by grasping handle 28 and camera arm 54.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A magnifier assembly for allowing a user to view enlarged images of objects, the assembly comprising:
   a stand including a lower base adapted to be supported upon a surface, the stand further including a body portion with first and second upper ends, a bridge extending between and interconnecting the first and second upper ends of the stand, the bridge being formed into a U-shaped trough;
   a monitor having front and back surfaces, the back of the monitor being detachably connected to the stand, the front of the monitor including a screen for displaying images;
   a camera connected to the stand by way of a flexible camera arm, the camera arm having a proximal end connected to the first upper end of the stand via a hinge, the camera arm also including a distal end that is pivotally connected to the camera, the hinge permitting the camera arm to be selectively positioned either in front of the monitor or within the trough of the bridge, when the camera arm is within the trough, the the camera is adjacent the second upper end of the stand and the trough and camera arm together form a handle by which the user may carry the assembly;
   a pair of flexible lighting arms, each lighting arm having a proximal end connected to the back of the monitor and a distal end including a light emitting diode (LED), the flexible lighting arms permitting the LEDs to be properly positioned in front of the monitor to illuminate the object being viewed.

2. A magnifier assembly comprising:
a stand including a body portion with first and second ends, a bridge extending between and interconnecting the first and second ends of the stand;
a monitor including a screen for displaying images;
a camera connected to the stand by way of a camera arm, the camera arm having a proximal end connected to the first end of the stand via a hinge, the camera arm also including a distal end that is connected to the camera, the hinge permitting the camera arm to be selectively positioned either in front of the monitor or along the bridge, when the camera arm is along the bridge, the camera is adjacent the second upper end of the stand and the bridge and camera arm together form a handle by which the user may carry the assembly.

3. The magnifier assembly as described in claim 2 wherein the monitor has front and back surfaces, and the back of the monitor is detachably connected to the stand, thereby permitting the monitor to be removed, replaced, or repaired.

4. The magnifier assembly as described in claim 2 further comprising a flexible lighting arm having a proximal end connected to the monitor and a distal end including a light emitting diode (LED), the flexible lighting arm permitting the LED to be properly positioned in front of the monitor to illuminate the object being viewed.

5. The magnifier assembly as described in claim 4 wherein two lighting arms are included.

6. The magnifier assembly as described in claim 2 wherein the stand further comprises a lower base adapted to be supported upon a surface.

7. The magnifier assembly as described in claim 2 wherein the bridge is formed into a U-shaped trough and the camera arm is dimensioned to be received within the U-shaped trough.

8. The magnifier assembly as described in claim 2 wherein the camera is pivotally connected to the distal end of the camera arm.

9. The magnifier assembly as described in claim 8 wherein the camera arm is flexible.

10. A magnifier assembly comprising:
a stand with first and second ends and a bridge extending therebetween, the bridge including a recess;
a monitor including a screen for displaying images the monitor mounted to the stand;
a camera;
a camera arm having a proximal end connected to the first end of the stand via a hinge, the camera arm also including a distal end that is connected to the camera, the hinge permitting the camera arm to be selectively positioned over top of the monitor or within the recess of the bridge, wherein when the arm is positioned within the recess of the bridge, the bridge and arm together form a handle for carrying the assembly.

* * * * *